(12) United States Patent
Rothschild

(10) Patent No.: US 8,488,759 B2
(45) Date of Patent: Jul. 16, 2013

(54) SYSTEM AND METHOD FOR PRODUCING AND TRANSMITTING SPEECH MESSAGES DURING VOICE CALLS OVER COMMUNICATION NETWORKS

(75) Inventor: Moshe Rothschild, Savyon (IL)

(73) Assignee: Moshe Rothschild, Savyon (IL)

( * ) Notice: Subject to any disclaimer, the term of this patent is extended or adjusted under 35 U.S.C. 154(b) by 191 days.

(21) Appl. No.: 12/984,460

(22) Filed: Jan. 4, 2011

(65) Prior Publication Data

US 2012/0170730 A1  Jul. 5, 2012

(51) Int. Cl.
*H04M 15/00* (2006.01)

(52) U.S. Cl.
USPC ............... 379/114.13; 379/221.05; 379/93.25

(58) Field of Classification Search
USPC .......... 379/88.22, 93.25, 114.13, 221.05, 379/121.05
See application file for complete search history.

(56) References Cited

U.S. PATENT DOCUMENTS

| | | | |
|---|---|---|---|
| 6,587,138 B1 | 7/2003 | Vogt et al. | |
| 6,937,699 B1 | 8/2005 | Schuster et al. | |
| 7,136,470 B1 | 11/2006 | Taylor et al. | |
| 7,280,968 B2 | 10/2007 | Blass | |
| 2003/0019347 A1 | 1/2003 | Weiner et al. | |
| 2004/0240646 A1 | 12/2004 | O'Donnell | |
| 2005/0246174 A1 | 11/2005 | DeGolia | |
| 2006/0203802 A1 | 9/2006 | Chou et al. | |
| 2007/0129054 A1 | 6/2007 | Andronikov et al. | |
| 2007/0274483 A1 | 11/2007 | Shapiro | |
| 2008/0008295 A1 | 1/2008 | Sivakumar | |
| 2008/0045184 A1 | 2/2008 | Randall et al. | |
| 2008/0080681 A1 | 4/2008 | Burgan et al. | |
| 2008/0101554 A1 | 5/2008 | Rhee et al. | |
| 2008/0221985 A1 | 9/2008 | Civanlar et al. | |
| 2008/0287107 A1 | 11/2008 | Carinio | |
| 2009/0006199 A1* | 1/2009 | Wang | 705/14 |
| 2009/0046704 A1 | 2/2009 | Sternam | |
| 2009/0141876 A1 | 6/2009 | Carter et al. | |
| 2009/0147778 A1 | 6/2009 | Wanless et al. | |
| 2009/0182616 A1 | 7/2009 | Ho et al. | |
| 2009/0225788 A1 | 9/2009 | Kephart et al. | |
| 2010/0128666 A1 | 5/2010 | Masson et al. | |
| 2010/0223314 A1 | 9/2010 | Gadel et al. | |
| 2010/0250368 A1 | 9/2010 | Porco | |
| 2011/0044437 A1* | 2/2011 | DeGolia | 379/88.22 |

FOREIGN PATENT DOCUMENTS

| | | |
|---|---|---|
| WO | WO 00/74358 | 12/2000 |
| WO | WO 01/41415 | 6/2001 |
| WO | WO 2009/089084 | 7/2009 |
| WO | WO 2010/012630 | 2/2010 |
| WO | WO 2010/055517 | 5/2010 |

* cited by examiner

*Primary Examiner* — Duc Nguyen
*Assistant Examiner* — Yosef K Laekemariam
(74) *Attorney, Agent, or Firm* — Pearl Cohen Zedek Latzer, LLP

(57) ABSTRACT

A system and method for producing and transmitting speech messages during voice calls over communication networks is introduced. The system and method for producing and transmitting speech messages during voice calls over communication networks include an advertisement server connected to a communication network. A user uses a calling device to call the advertisement server and record advertisement in his specific voice or voice samples off which an advertisement synthesizer can generate advertisements in the user's specific voice. These advertisements are later played during voice calls between a calling device and a destination device. A billing system is used to log and bill advertisers for the advertisements played.

7 Claims, 6 Drawing Sheets

US 8,488,759 B2

SYSTEM AND METHOD FOR PRODUCING AND TRANSMITTING SPEECH MESSAGES DURING VOICE CALLS OVER COMMUNICATION NETWORKS

FIELD OF THE INVENTION

The present invention relates to voice conversations over communication networks, and more particularly, to producing and transmitting speech messages during voice conversation over communication networks, using user's specific voices.

BACKGROUND OF THE INVENTION

There are several various known systems in use for broadcasting advertisements and notifications by various means of communication. There is a great advantage to advertising performed in the voice, which is personally known to the listener, adding credibility to advertising made by means of personal conversation.

This purpose requires systems and a method that will enable broadcasting messages during a conversation through a means of communication, with the message being spoken in the speaker's voice, be it natural or synthetic. Use of this system and method will enable collection of fees from advertisers and providing discounted communication fees to a speaker who provides the voice for broadcasting a message.

A ringback advertising method, system and apparatus are described in U.S. patent application Ser. No. 12/014,284 of Ho et al. and is incorporated by reference for all purposes as if fully set forth herein.

Ho et al.'s application describes methods, systems and apparatus for inserting audible advertisements within a phone call. The advertisements being inserted into the phone calls are prerecorded and played when a call is being made.

Current technologies allow systems to recognize a user's speech, process it and synthesize a speech signal according to predefined algorithms. One example for the use of such technologies can be seen in the iTranslate software sold by Ectaco Inc. of 31-21 31st Street, Long Island City, N.Y., 11106. The iTranslate software receives a user's speech signal, processes it, and outputs an audible translation of the received speech signal.

A method for digitally generating speech with improved prosodic characteristics is described in U.S. Pat. No. 7,280,968 by Blass, which is incorporated by reference for all purposes as if fully set forth herein.

Blass describes a method in which digitally generating speech with improved prosodic characteristics can include receiving a speech input, determining at least one prosodic characteristic contained within the speech input, and generating a speech output including the prosodic characteristic within the speech output.

None of the prior art devices comprises all of the above characteristics and functions.

There is therefore a need for a system and method for producing and transmitting speech messages during voice conversation over communication networks using user's specific voices, which comprises a combination of all of the above characteristics and functions.

SUMMARY OF EMBODIMENTS OF THE INVENTION

The background art does not teach or suggest a system and method for producing and transmitting speech messages during voice conversation over communication networks using users' specific voices.

The present invention overcomes these deficiencies of the background art by providing a system that incorporates voice recognition, speech generation and a dedicated advertisement server which are connected to one or more communication networks.

Additional objects and advantages of the invention will be set forth in part in the description which follows and, in part, will be obvious from the description, or may be learned by practice of the invention.

According to the present invention there is provided a communication system for producing and transmitting speech messages during voice calls over communication networks, the communication system including: (a) a calling device for initiating a voice call; (b) a first network, operatively connected to the calling device; (c) a destination device, operatively connected to the first network; (d) an advertisement server, operatively connected to the first network; and (e) an advertisement data bank, wherein the advertisement data bank, being programmed to generate advertisements using a caller's own voice and integrate the advertisements into a voice call between the calling device and the destination device.

According to a further feature of the described embodiments the advertisement server includes: (i) a network adapter for interfacing the advertisement server with the first network; (ii) a router operatively connected to the network adapter, wherein the network adapter is programmed to transfer calls to the router; (iii) a voice sampler, for a sampling a caller's voice, the voice sampler being operatively connected to the router; (iv) a recorded speech samples bank operatively connected to the voice sampler, wherein the recorded speech samples bank holds samples of a callers' voice which are used to synthesize voice advertisements in the callers' own voice; (v) an advertisement integrator operatively connected to the network adapter and to the router; (vi) a recorded advertisement bank operatively connected to the voice sampler, wherein the recorded advertisement bank holds recordings of complete advertisements recorded by the calling device, wherein the voice sampler is programmed to transfer a sampled voice to either the recorded speech samples bank or the recorded advertisement bank, according to a purpose of a call; and (vii) an advertisement management system operatively connected to the advertisement integrator, wherein the advertisement management system is programmed to accepts data from the recorded advertisement bank, the recorded speech samples bank and the advertisement data bank.

According to a further feature of the described embodiments the advertisement server further includes: (viii) a billing system operatively connected to the advertisement management system.

According to a further feature of the described embodiments the advertisement management system includes: (vii a) an advertisement management system multiplexer operatively connected to the advertisement integrator, wherein the advertisement management system multiplexer is programmed to pass an appropriate advertisement to the advertisement integrator; (vii b) an advertisement selection manager operatively connected to the advertisement management system multiplexer, wherein the advertisement selection manager is programmed to decide which type of advertisement is to be played; and (vii c) an advertisement synthesizer operatively connected to the advertisement management system multiplexer, wherein the advertisement synthesizer is programmed to create advertisements in the callers' own voice, wherein the advertisement management system is used to decide which advertisement is to be played onto a voice call from the calling device to the destination device.

According to a further feature of the described embodiments the advertisement integrator includes: (v a) an advertisement integrator multiplexer operatively connected to the network adapter, the router, and the advertisement management system; and (v b) an advertisement scheduler connected to the advertisement integrator multiplexer, wherein the advertisement integrator multiplexer is controlled by the advertisement scheduler, and wherein the advertisement scheduler is programmed to decide when to play an advertisement and when to transfer a voice call to the network adapter.

According to a further feature of the described embodiments the communication system further includes: (e) a network gateway; and (f) a second network operatively connected to the network gateway, wherein the network gateway and the second network are disposed between the first network and the destination device.

According to the present invention there is provided a method for using a user's specific voice to place advertisements within a voice call, the method including the stages of: (a) connecting a calling device to an advertisement server, by a first network; (b) calling a destination device by a communication system; (c) answering a call by the destination device; (d) linking the calling device and the destination device; (e) playing an advertisement in the user's specific voice onto the call at pre-determined events; and (f) terminating a link between the calling device and the destination device.

According to a further feature of the described method the method further includes the stages of; (g) logging the call and the advertisements that were played during the call; and (h) updating a billing system.

According to a another further feature of the described method the method further includes, before performing the stage of connecting a calling device to an advertisement server, by a first network, the stage, of: (i) sending a message to the user, by the advertisement server, wherein the message includes contents of advertisements to be recorded, and wherein the advertisement server asks the user to call the advertisement server; (j) entering a calling stage, when the user calls the advertisement server; (k) entering a recording stage in which the user records advertisements in his own specific voice; (l) terminating the call after finishing recording the advertisements.

According to still another further feature of the described method, the method further includes, before performing the stage of connecting a calling device to an advertisement server, by a first network, the stage, of: (i) sending a message to the user, by the advertisement server, asking the user to call the advertisement server in order to record voice samples; (j) entering a calling stage; (k) entering a recording stage in which the user records in the user's voice a specific number of pre-defined phrases as determined by an advertisement synthesizers; (l) terminating the call after finishing the recording of the pre-defined phrases; (m) analyzing, by the communication system the user's voice; (n) building a phonetic database for the user and stores the phonetic database in a recorded speech samples bank; and (o) composing, by the advertisement synthesizer, synthesized advertisements in the user's specific voice.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
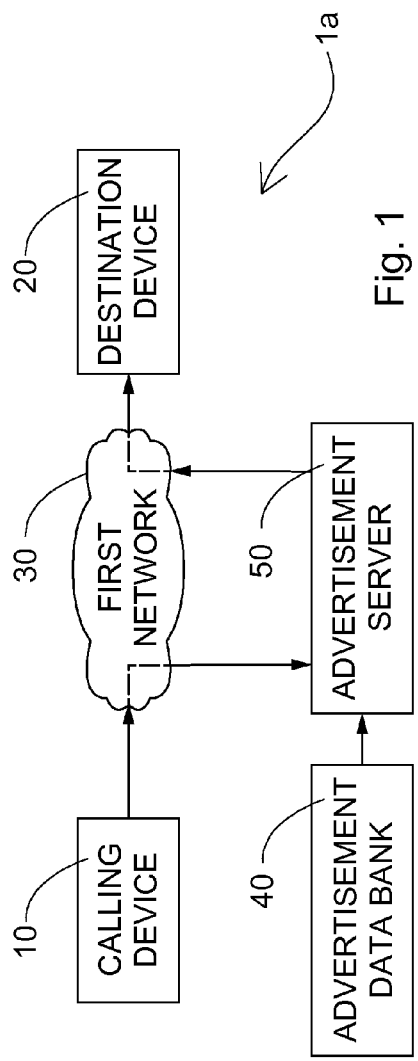
FIG. 1 is a schematic block diagram of a first exemplary communication system, according to the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention is of a system and a method for producing and transmitting speech messages during voice conversation over communication networks.

The principles and operation of a system and a method for producing and transmitting speech messages during voice conversation over communication networks according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings.

Unless otherwise defined, all technical and scientific terms used herein have the same meaning as commonly understood by one of ordinary skill in the art to which this invention belongs. The materials, dimensions, methods, and examples provided herein are illustrative only and are not intended to be limiting.

The following list is a legend of the numbering of the application illustrations:
1 communication system
10 calling device
20 destination device
30 first network
40 advertisement data bank
50 advertisement server 60 network gateway
70 second network
502 network adapter
504 record/call router
506 voice sampler
508 recorded advertisements bank
510 recorded speech samples bank
512 advertisement management system
514 billing system
516 advertisement integrator
600 advertisement selection manager
602 advertisement management system multiplexer
604 advertisement synthesizer
700 advertisement scheduler
702 advertisement integrator multiplexer Referring now to the drawings, FIG. 1 is a schematic block diagram of a first exemplary communication system 1a, according to the present invention.

In the present embodiment of the communication system 1a, a calling device 10 initiates a voice call to a destination device 20 through a first network 30. The network 30 diverts the call to an advertisement server 50 which uses an advertisement data bank 40 to generate advertisements using the caller's own voice and integrate said advertisements into the voice call between the calling device 10 and the destination device 20.

The first network 30 may be any type of communication network such as a local area network (LAN), wide area network (WAN), public switched telephone network (PSTN), cellular phone network etc. or a combination of thereof.

The calling device 10 and the destination device 20 may be any type of communication devices suitable for conversion of sonic waves to communication signals, such as electronic, electromagnetic, or optical signals, etc., and vice-versa, respectively.

Figure 2:
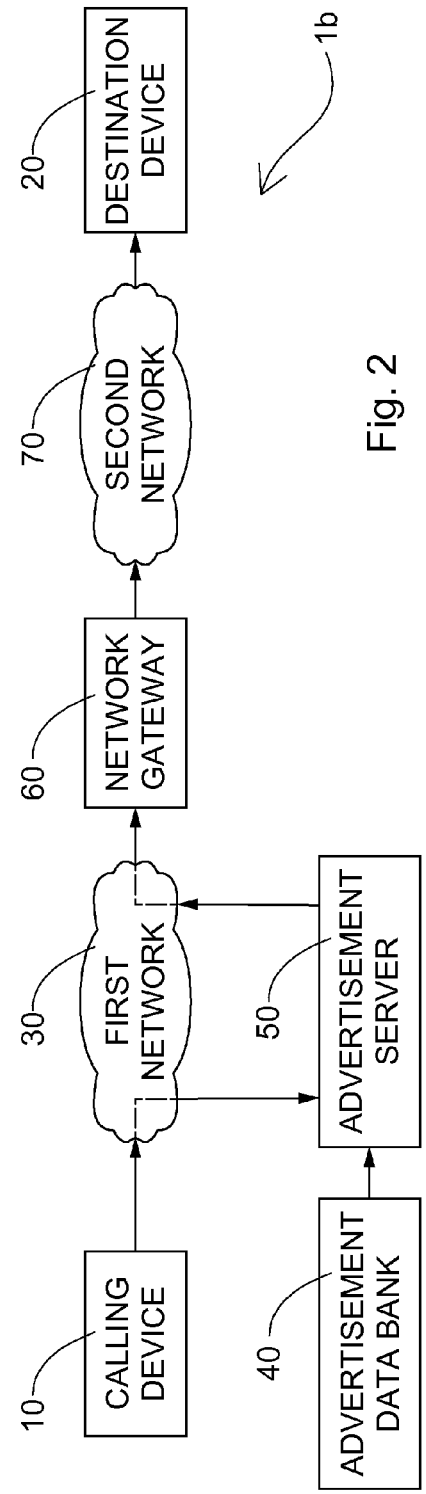
FIG. 2 is a schematic block diagram of a second exemplary communication system, according to the present invention.

FIG. 2 is a schematic block diagram of a second exemplary communication system 1b, according to the present invention.

In the present embodiment, the destination device 20 is connected to a second network 70 which is different than the first network 30. The first network 30 and the second network 70 may be of the same type or of different types. A network gateway 60 is used to connect the two networks.

Figure 3:
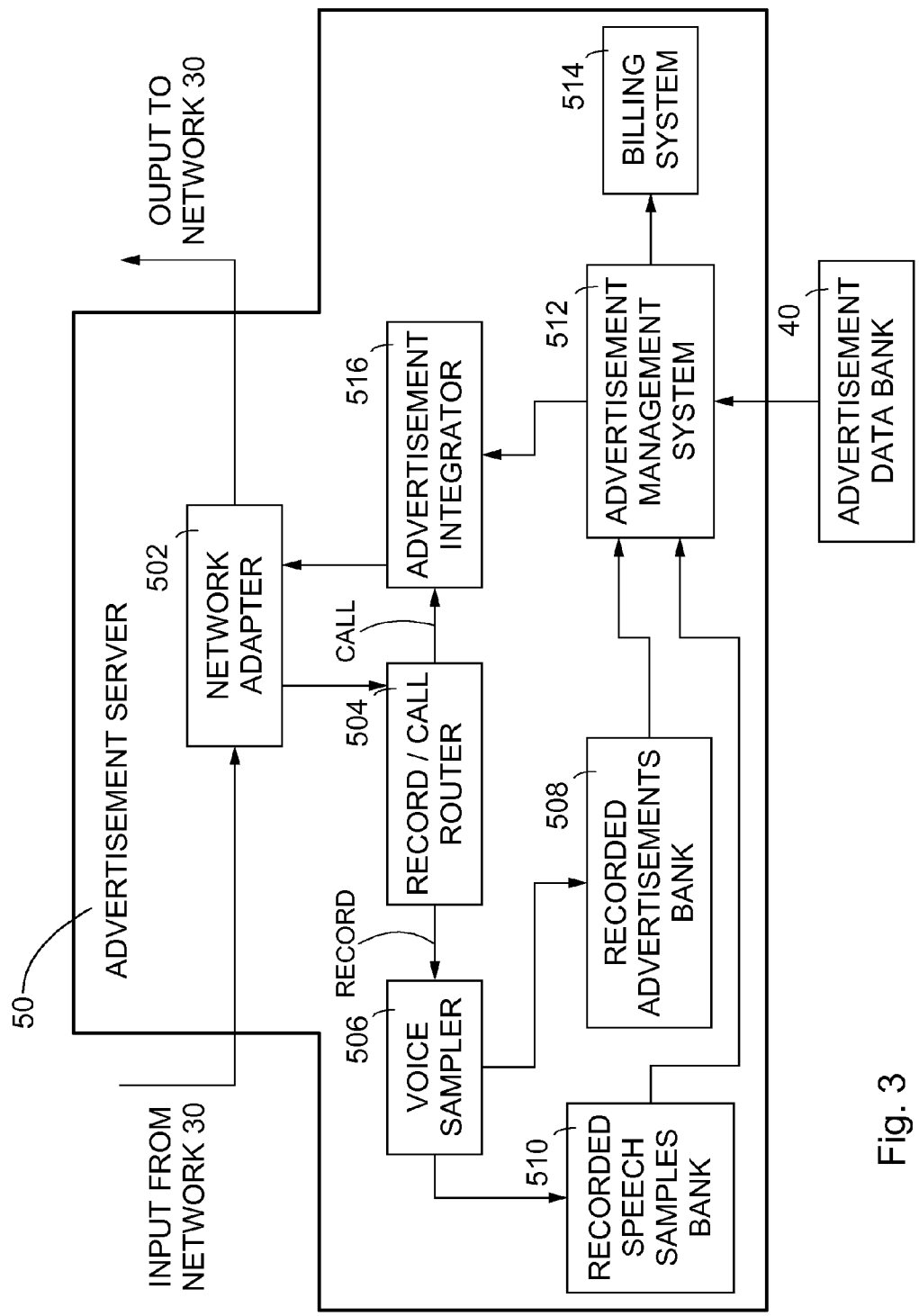
FIG. 3 is a schematic block diagram of an advertisement server, according to the present invention.

FIG. 3 is a schematic block diagram of an advertisement server 50, according to the present invention.

The advertisement server 50 is equipped with a network adapter 502 which is used to interface the advertisement server 50 with the first network 30.

A call generated by the calling device 10 (not shown in the present illustration, shown in FIGS. 1 and 2), is diverted by the first network 30 into the network adapter 502 which transfers the call to a record/call router 504. If the call is directed to the advertisement server 50 (i.e., there is no destination device 20) in order to record the caller's voice, the record/call router 504 routes the call to a voice sampler 506. Otherwise, the record/call router 504 routes the call to an advertisement integrator 516.

The voice sampler 506 samples the caller's voice and according to the purpose of the call, transfers the sampled voice to either a recorded speech samples bank 510 or a recorded advertisement bank 508.

The recorded advertisement bank 508 holds recordings of complete advertisements recorded by the calling device 10 in the caller's own voice.

Figure 4:
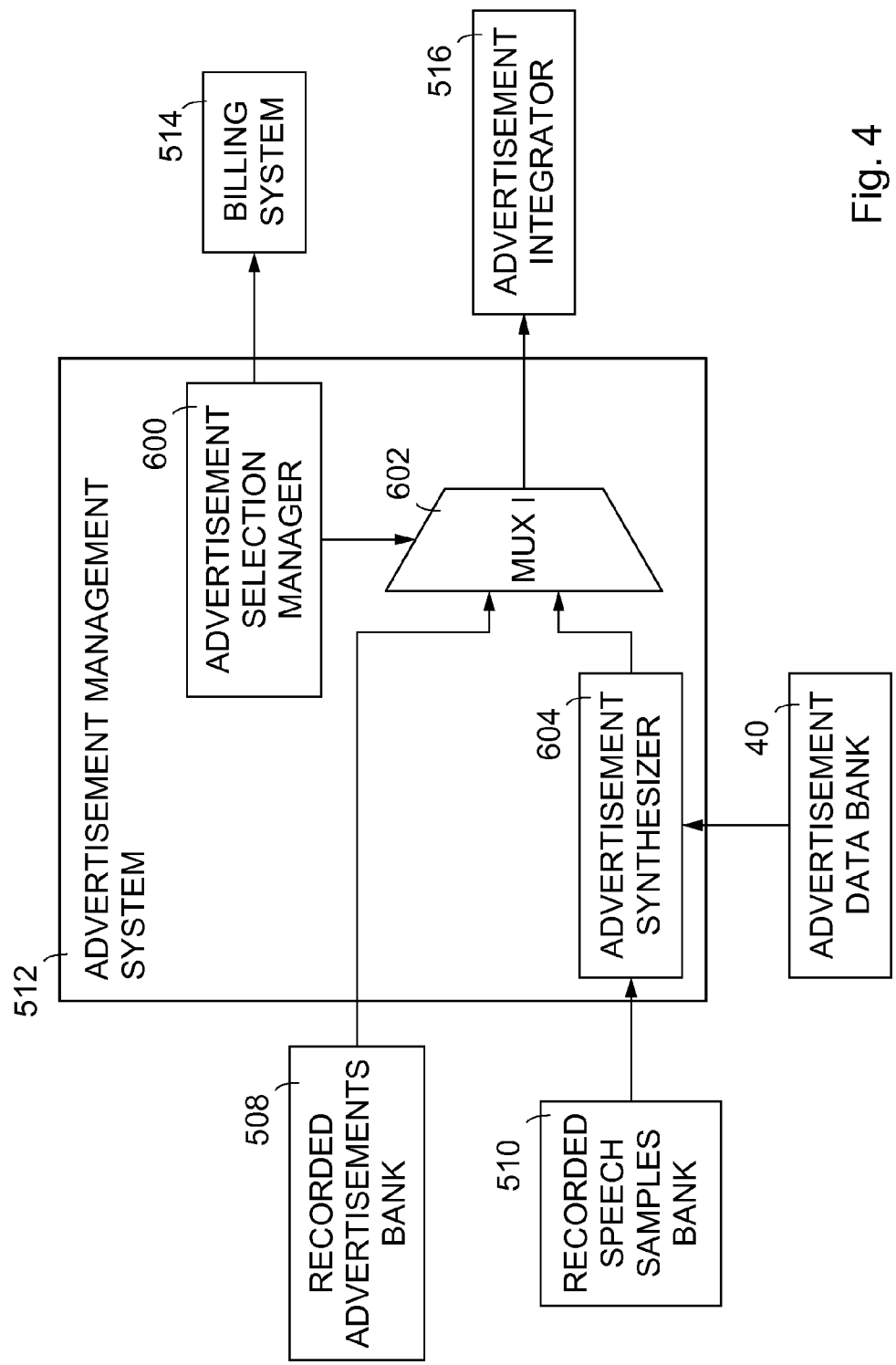
FIG. 4 is a schematic block diagram of an advertisement management system, according to the present invention.

The recorded speech samples bank 510 holds samples of the callers' voice which are used to synthesize voice advertisements in the callers' own voice in an advertisement synthesizer 604 (not shown in the present illustration, shown in FIG. 4).

An advertisement management system 512 accepts data from the recorded advertisement bank 508 and the recorded speech samples bank 510 as well as the advertisement data bank 40 to generate an advertisement using the caller's own voice which is input into an advertisement integrator 516. The advertisement management system 512 also updates a billing system 514 which is used to bill the advertisers whose advertisements are played.

When a call is directed to a destination device 20 (other than the advertisement server 50) is made, the record/call router 504 routes the call to the advertisement integrator 516 which inserts the advertisement generated by the advertisement management system 512 into the call. The call is then transferred to the network adapter 502 and from it, is relayed to the destination device 20 (not shown in the present illustration, shown in FIGS. 1 and 2), through the first network 30 (and optionally through the network gateway 60 and second network 70, (both not shown in the present illustration, shown in FIG. 2).

FIG. 4 is a schematic block diagram of an advertisement management system 512, according to the present invention.

The advertisement management system 512 is used to decide which advertisement is to be played onto a voice call from the calling device 10, (not shown in the present illustration, shown in FIGS. 1 and 2), to the destination device 20. Two types of advertisements can be used; pre-recorded advertisements, which are stored in the recorded advertisements bank 510 or synthesized advertisements generated by an advertisement synthesizer 604 by the use of speech samples which are stored in the recorded speech samples bank 508 and advertisement data 40. Using current well-known methods of voice synthesizing, the advertisement synthesizer 604 creates advertisements in the caller's own voice.

An advertisement selection manager 600 decides which type of advertisement is to be played and signals an advertisement management system multiplexer 602 (MUX I), to pass the appropriate advertisement to the advertisement integrator 516. Another function of the advertisement selection manager 600 is to notify the billing system 514 as to which advertisement is played in order to be able to bill the appropriate advertiser.

Figure 5:
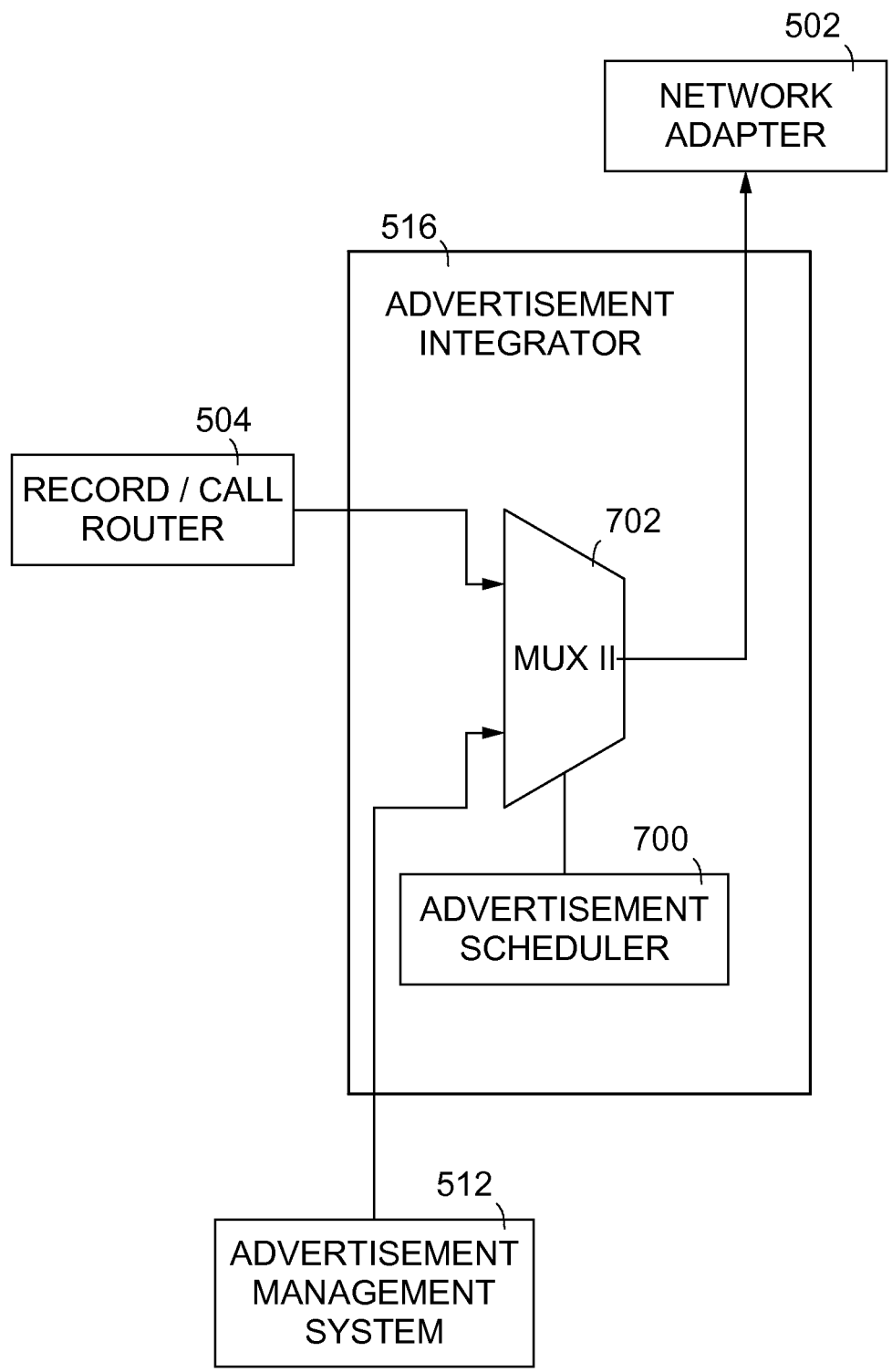
FIG. 5 is a schematic block diagram of an advertisement integrator, according to the present invention.

FIG. 5 is a schematic block diagram of an advertisement integrator 516, according to the present invention.

The advertisement integrator 516 is equipped with an advertisement integrator multiplexer 702 (MUX II), which is controlled by an advertisement scheduler 700. The advertisement scheduler 700 decides when to play an advertisement and when to transfer the voice call to the network adapter 502.

Figure 6:
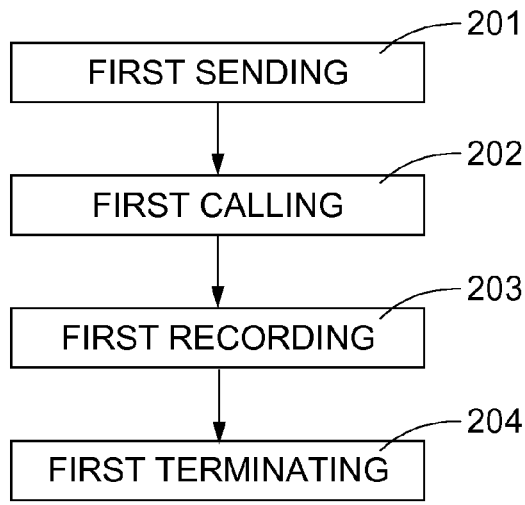
FIG. 6 is a flow chart that schematically illustrates a method for recording advertisements using a user's specific voice, according to the present invention.

FIG. 6 is a flow chart that schematically illustrates a method for recording advertisements using a user's specific voice, according to the present invention.

When a new advertisement is entered into the advertisement bank 40, (not shown in the present illustration, shown in FIG. 1), the communication system 1 enters the first sending stage (stage 201) where the advertisement server 50, (not shown in the present illustration, shown in FIG. 1), sends a message to the user (by means of an e-mail, short message system (SMS) message or any other means of messaging) asking him to call the advertisement server 50. The message includes the contents of the advertisements to be recorded.

When the user calls the advertisement server 50, the communication system 1 enters the first calling stage (stage 202)

and then moves to the first recording stage (stage 203) in which the user records the advertisements in his own specific voice.

Once the user had finished recording the advertisements, the communication system 1 moves to the first terminating stage (stage 204) where it terminates the call.

Figure 7:
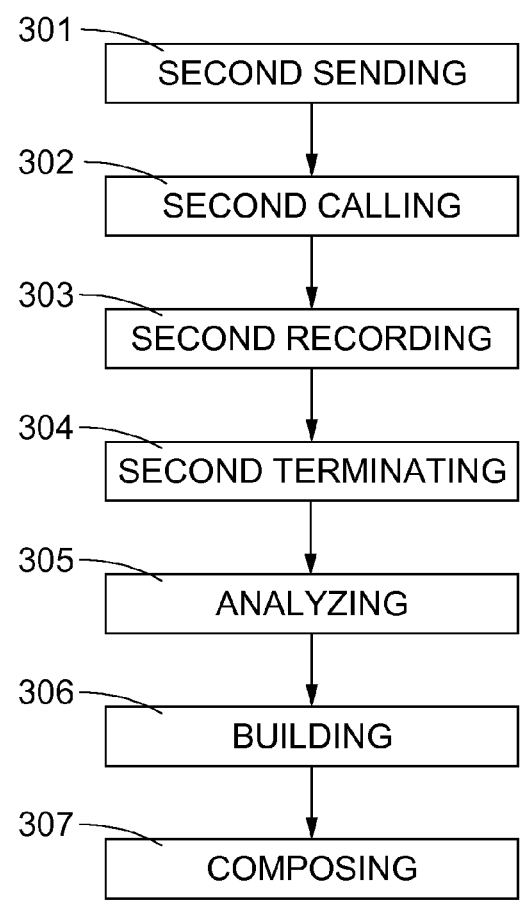
FIG. 7 is a flow chart that schematically illustrates a method for using a user's specific voice to synthesize advertisements, according to the present invention.

FIG. 7 is a flow chart that schematically illustrates a method for using a user's specific voice to synthesize advertisements, according to the present invention. The communication system 1 enters second sending stage (stage 301) where the advertisement server 50, (not shown in the present illustration, shown in FIG. 1), sends a message to the user (by means of an e-mail, short message system (SMS) message, or any other means of messaging) prompting to call the advertisement server 50 in order to record voice samples.

When the user calls the advertisement server 50, the communication system 1 enters the second calling stage (stage 302) and then moves to the second recording stage (stage 303) in which the user records a specific number of pre-defined phrases as determined by the advertisement synthesizers' 604, (not shown in the present illustration, shown in FIG. 4), algorithms. Once the user finishes the required recordings, the communication system 1 moves to the second terminating stage (stage 304) where it terminates the call.

The following stage is the analyzing stage (stage 305) in which the communication system 1 analyzes the user's voice and moves to the building stage (stage 306) where it builds a phonetic database for the user and stores it in the recorded speech samples bank 510, (not shown in the present illustration, shown in FIG. 3).

Once the phonetic database is built, the communication system 1 moves to the composing stage (stage 307) where the advertisement synthesizer 604 (not shown in the present illustration, shown in FIG. 4), synthesizes advertisements in the user's specific voice.

Figure 8:
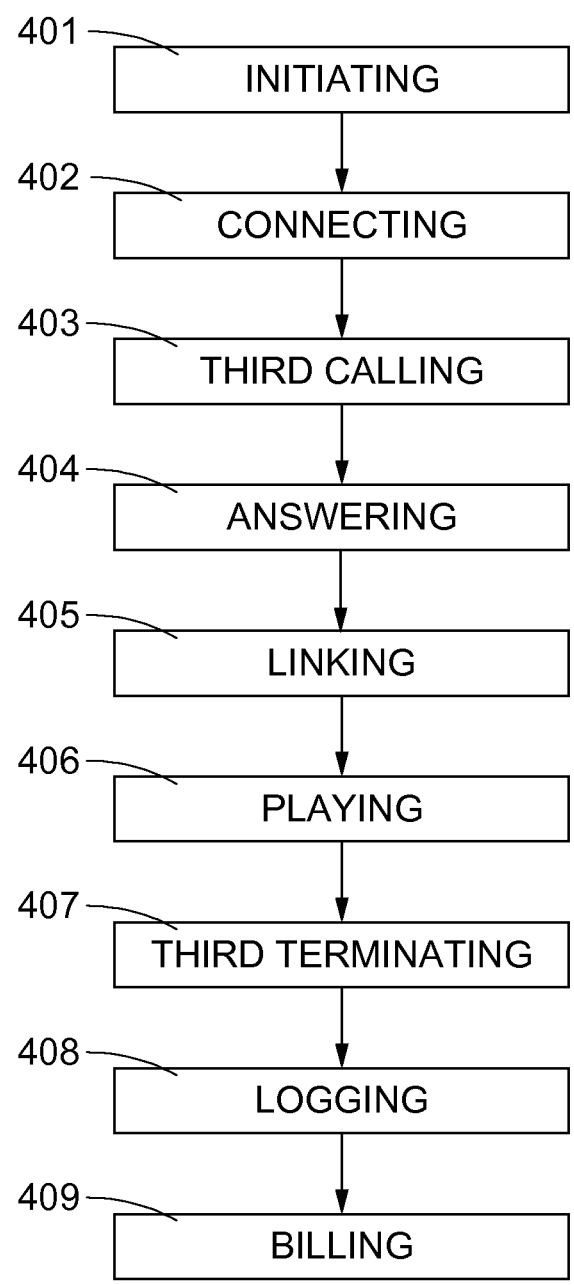
FIG. 8 is a flow chart that schematically illustrates a method for using a user's specific voice to place advertisements within a voice call, according to the present invention.

FIG. 8 is a flow chart that schematically illustrates a method for using a user's specific voice to place advertisements within a voice call, according to the present invention.

When a user initializes a call, the communication system 1 enters the initializing stage (stage 401) and moves to the connecting stage (stage 402) in which the first network 30 (not shown in the present illustration, shown in FIG. 1a) connects the calling device 10 (not shown in the present illustration, shown in FIG. 1) to the advertisement server 50.

In the next stage, the third calling stage (stage 403), the communication system calls the destination device 20. Following that, when the destination device 20, (not shown in the present illustration, shown in FIG. 1), answers the call, the communication system 1 moves to the answering stage (stage 404) and then moves to the linking stage (stage 405) where it links the calling device 10 and the destination device 20.

After linking both devices, the communication system 1 moves to the playing stage (stage 406) in which at pre-determined events (such as first linkage) and times (such as every 5 minutes) an advertisement in the user's specific voice is played onto the call.

Upon termination of the call by either party, the communication moves to the third termination stage (stage 407) in which the system terminates the link between the calling device 10 and the destination device 20.

Following this, the communication system moves to the logging stage (stage 408) where it logs the call and the advertisements that were played during the call. Next, the communication system 1 moves to the billing stage (stage 409) where it updates the billing system 514 (not shown in the present illustration, shown in FIG. 3).

Prior to use of the user's specific voice, the user can be subject to a process including registration and signing an agreement enabling the advertiser, or any other authorized party, to use the user's voice in any manner serving the purpose of the advertisement.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A communication system for producing and transmitting speech messages during voice calls over communication networks, said communication system comprising:
   (a) a calling device for initiating a voice call;
   (b) a first network, operatively connected to said calling device;
   (c) a destination device, operatively connected to said first network;
   (d) an advertisement server, operatively connected to said first network; and
   (e) an advertisement data bank, wherein said advertisement data bank is programmed to generate advertisements using a caller's own voice and integrate said advertisements into a voice call between said calling device and said destination device,
   wherein said advertisement server includes:
   (i) a network adapter for interfacing said advertisement server with said first network;
   (ii) a router operatively connected to said network adapter, wherein said network adapter being programmed to transfer calls to said router;
   (iii) a voice sampler, for a sampling a caller's voice, said voice sampler being operatively connected to said router;
   (iv) a recorded speech samples bank operatively connected to said voice sampler, wherein said recorded speech samples bank holds samples of a caller's voice which are used to synthesize voice advertisements in said caller's own voice;
   (v) an advertisement integrator operatively connected to said network adapter and to said router;
   (vi) a recorded advertisement bank operatively connected to said voice sampler, wherein said recorded advertisement bank holds recordings of complete advertisements recorded by said calling device, wherein said voice sampler is programmed to transfer a sampled voice to either said recorded speech samples bank or said recorded advertisement bank, according to a purpose of a call; and
   (vii) an advertisement management system operatively connected to said advertisement integrator, wherein said advertisement management system being programmed to accept data from said recorded advertisement bank, said recorded speech samples bank and said advertisement data bank.

2. A communication system for producing and transmitting speech messages during voice calls over communication networks, said communication system comprising:
   (a) a calling device for initiating a voice call;
   (b) a first network, operatively connected to said calling device;
   (c) a destination device, operatively connected to said first network;
   (d) an advertisement server, operatively connected to said first network; and (e) an advertisement data bank, wherein said advertisement data bank is programmed to generate advertisements using a caller's own voice and integrate said advertisements into a voice call between said calling device and said destination device;

(e) a network gateway; and (f) a second network operatively connected to said network gateway, wherein said network gateway and said second network are disposed between said first network and said destination device, wherein said advertisement server includes:

(i) a network adapter for interfacing said advertisement server with said first network;

(ii) a router operatively connected to said network adapter, wherein said network adapter is programmed to transfer calls to said router;

(iii) a voice sampler, for a sampling a caller's voice, said voice sampler being operatively connected to said router;

(iv) a recorded speech samples bank operatively connected to said voice sampler, wherein said recorded speech samples bank holds samples of a callers' voice which are used to synthesize voice advertisements in said callers' own voice;

(v) an advertisement integrator operatively connected to said network adapter and to said router;

(vi) a recorded advertisement bank operatively connected to said voice sampler, wherein said recorded advertisement bank holds recordings of complete advertisements recorded by said calling device, wherein said voice sampler being programmed to transfers a sampled voice to either said recorded speech samples bank or said recorded advertisement bank, according to a purpose of a call; and (vii) an advertisement management system operatively connected to said advertisement integrator, wherein said advertisement management system is programmed to accepts data from said recorded advertisement bank, said recorded speech samples bank and said advertisement data bank.

3. The communication system of claim 1, wherein said advertisement management system includes:

(vii a) an advertisement management system multiplexer operatively connected to said advertisement integrator, wherein is advertisement management system multiplexer being programmed to pass an appropriate advertisement to said advertisement integrator;

(vii b) an advertisement selection manager operatively connected to said advertisement management system multiplexer, wherein said advertisement selection manager is programmed to decides which type of advertisement is to be played; and (vii c) an advertisement synthesizer operatively connected to said advertisement management system multiplexer, wherein said advertisement synthesizer is programmed to creates advertisements in the callers' own voice, wherein said advertisement management system is used to decide which advertisement is to be played onto a voice call from said calling device to said destination device.

4. The communication system of claim 1, wherein said advertisement integrator includes:

(v a) an advertisement integrator multiplexer operatively connected to said network adapter, said router, and said advertisement management system; and (v b) an advertisement scheduler connected to said advertisement integrator multiplexer, wherein said advertisement integrator multiplexer is controlled by said advertisement scheduler, and wherein said advertisement scheduler is programmed to decides when to play an advertisement and when to transfer a voice call to said network adapter.

5. The communication system of claim 2, wherein said advertisement server further includes:

(viii) a billing system operatively connected to said advertisement management system.

6. The communication system of claim 2, wherein said advertisement management system includes:

(vii a) an advertisement management system multiplexer operatively connected to said advertisement integrator, wherein said advertisement management system multiplexer is programmed to pass an appropriate advertisement to said advertisement integrator;

(vii b) an advertisement selection manager operatively connected to said advertisement management system multiplexer, wherein said advertisement selection manager is programmed to decides which type of advertisement is to be played; and (vii c) an advertisement synthesizer operatively connected to said advertisement management system multiplexer, wherein said advertisement synthesizer is programmed to creates advertisements in the caller's own voice, wherein said advertisement management system is used to decide which advertisement is to be played onto a voice call from said calling device to said destination device.

7. The communication system of claim 2, wherein said advertisement integrator includes:

(v a) an advertisement integrator multiplexer operatively connected to said network adapter, said router, and said advertisement management system; and (v b) an advertisement scheduler connected to said advertisement integrator multiplexer, wherein said advertisement integrator multiplexer is controlled by said advertisement scheduler, and wherein said advertisement scheduler is programmed to decide when to play an advertisement and when to transfer a voice call to said network adapter.

\* \* \* \* \*